United States Patent
Kim

(10) Patent No.: US 8,952,580 B2
(45) Date of Patent: Feb. 10, 2015

(54) LINEAR VIBRATION MOTOR

(75) Inventor: Jin Hoon Kim, Gyunggi-do (KR)

(73) Assignee: Samsung Electro-Mechanics Co., Ltd, Gyeonggi-Do (KR)

( * ) Notice: Subject to any disclaimer, the term of this patent is extended or adjusted under 35 U.S.C. 154(b) by 251 days.

(21) Appl. No.: 13/592,239

(22) Filed: Aug. 22, 2012

(65) Prior Publication Data

US 2013/0082546 A1  Apr. 4, 2013

(30) Foreign Application Priority Data

Sep. 30, 2011  (KR) .................. 10-2011-0100256

(51) Int. Cl.
| | | |
|---|---|---|
| H02K 33/00 | (2006.01) | |
| H02K 33/18 | (2006.01) | |
| H02K 33/16 | (2006.01) | |
| H02K 1/34 | (2006.01) | |
| H02K 5/22 | (2006.01) | |
| H02K 33/02 | (2006.01) | |
| H04R 9/02 | (2006.01) | |
| H04R 9/04 | (2006.01) | |
| B06B 1/04 | (2006.01) | |

(52) U.S. Cl.
CPC ................ *H02K 33/18* (2013.01); *H02K 33/16* (2013.01); *H02K 1/34* (2013.01); *H02K 5/22* (2013.01); *H02K 33/02* (2013.01); *H04R 9/025* (2013.01); *H04R 9/04* (2013.01); *B06B 1/045* (2013.01)
USPC .............. 310/25; 310/12.01; 310/15; 310/30; 310/40 MM; 310/71; 310/89

(58) Field of Classification Search
CPC ......... H02K 1/34; H02K 33/02; H02K 33/16; H02K 33/18; H02K 5/22; B06B 1/045; H02R 9/025; H02R 9/04
USPC ................ 310/12, 15, 25, 30, 40 MM, 71, 89
See application file for complete search history.

(56) References Cited

U.S. PATENT DOCUMENTS

| | | | | |
|---|---|---|---|---|
| 4,259,603 | A | * | 3/1981 | Uchiyama et al. .......... 310/68 B |
| 4,827,167 | A | * | 5/1989 | Mayumi et al. ................. 310/89 |
| 4,853,568 | A | * | 8/1989 | Fujiwara ..................... 310/68 C |
| 5,804,895 | A | * | 9/1998 | Tsuzaki et al. .......... 310/40 MM |
| 7,652,401 | B2 | * | 1/2010 | Mun et al. ....................... 310/71 |

(Continued)

FOREIGN PATENT DOCUMENTS

| | | | |
|---|---|---|---|
| KR | 1046003 | B1 * | 7/2011 |
| KR | 101046003 | B1 | 7/2011 |

(Continued)

OTHER PUBLICATIONS

Choi, English translation, KR101046003B1, Jul. 2011.*

(Continued)

*Primary Examiner* — John K Kim
(74) *Attorney, Agent, or Firm* — Bracewell & Giuliani LLP; Brad Y. Chin

(57) ABSTRACT

Disclosed herein is a linear vibration motor including: a stator part; a vibrator part received in the stator part to thereby linearly vibrate; an elastic member having one end fixedly coupled to the stator part and the other end fixedly coupled to the vibrator part, wherein the vibrator part includes a printed circuit board having one end fixedly coupled to the stator part and the other end fixedly coupled to the vibrator part to thereby linearly vibrate integrally with the vibrator part.

8 Claims, 4 Drawing Sheets

(56) References Cited

U.S. PATENT DOCUMENTS

| | | | |
|---|---|---|---|
| 8,786,144 B2* | 7/2014 | Lee et al. | 310/25 |
| 2010/0052445 A1* | 3/2010 | Kingrey et al. | 310/89 |
| 2013/0082546 A1* | 4/2013 | Kim | 310/25 |
| 2013/0140918 A1* | 6/2013 | Choi | 310/25 |

FOREIGN PATENT DOCUMENTS

| | | | |
|---|---|---|---|
| KR | 101046044 B1 | | 7/2011 |
| KR | 1055508 B1 | * | 8/2011 |

OTHER PUBLICATIONS

Lee, English translation, KR101055508B1, Aug. 2011.*

Office Action from counterpart Korean Patent Application No. 10-2011-0100256, mailed Dec. 18, 2012, 10 pages, English Summary included.

CN 201210100113.X Office Action dated Jun. 26, 2014; 20pgs.

* cited by examiner

LINEAR VIBRATION MOTOR

CROSS REFERENCE TO RELATED APPLICATION

This application claims the benefit of Korean Patent Application No. 10-2011-0100256, filed on Sep. 30, 2011, entitled "Linear Vibration Motor", which is hereby incorporated by reference in its entirety into this application.

BACKGROUND OF THE INVENTION

1. Technical Field

The present invention relates to a linear vibration motor.

2. Description of the Related Art

A general vibration motor, which is a component converting electrical energy into mechanical vibration using a principle of generating electromagnetic force, is mounted in a mobile communication terminal, a portable terminal, and the like, to be used for silently notifying a user of call reception.

Currently, a linear vibration motor has been generally used as the vibration motor. The linear vibration motor is generally disposed at an edge portion of a device and generates vibration in a direction perpendicular to an object receiving the vibration.

A general linear vibration motor includes a stator part, a vibrator part, and an elastic member coupled to the stator part and elastically supporting the vibrator part.

In addition, the stator part includes a case, a bracket, and a magnet, and the vibrator part includes a coil a weight body, and a printed circuit board.

In the internal structure of the linear vibration motor according to the prior art described above, the printed circuit has one end electrically connected to the coil and the other end coupled to the bracket configuring the stator part, such that it linearly moves integrally with the vibrator part.

However, a coupling surface of the printed circuit board coupled to the bracket may be separated from the bracket due to linear movement for a long period of time or external impact.

SUMMARY OF THE INVENTION

The present invention has been made in an effort to provide a linear vibration motor including a case provided with a coupling part fixing a portion of a printed circuit board in order to increase adhesion between the printed circuit board and a stator part and the printed circuit board coupled to the case.

According a preferred embodiment of the present invention, there is provided a linear vibration motor including: a stator part; a vibrator part received in the stator part to thereby linearly vibrate; an elastic member having one end fixedly coupled to the stator part and the other end fixedly coupled to the vibrator part, wherein the vibrator part includes a printed circuit board having one end fixedly coupled to the stator part and the other end fixedly coupled to the vibrator part to thereby linearly vibrate integrally with the vibrator part.

The stator part may include: a case having an inner space formed therein so as to receive the vibrator part therein; a bracket coupled to a lower portion of the case to thereby compart the inner space of the case; and a magnet selectively coupled to the case or the bracket, wherein the case includes a coupling part to which the printed circuit board is partially coupled.

The printed circuit board may include: a power supplying part fixedly coupled to the bracket and provided with a power connection pad; a mounting part extended from the power supplying part and coupled to the coupling part of the case; an elastic part extended from the mounting part in a spiral direction so as to have elastic force; and a power applying part formed at one end of the elastic part and electrically coupled to the vibrator part to thereby apply external power to the vibrator part.

The coupling part may include: a penetration groove formed so that the mounting part of the printed circuit board is fitting-coupled thereinto in a width direction; and support parts formed to be protruded from both sides of the penetration groove toward the bracket and each including catching jaws formed in order to support the mounting part of the printed circuit board.

The mounting part may include predetermined grooves formed inwardly in the width direction at both sides thereof so as to face the catching jaws.

The magnet may include: a first magnet coupled to an upper surface of an inner side of the case; and a second magnet coupled to an upper surface of an inner side of the bracket.

The stator part may further include a plate yoke coupled to an upper surface of an inner side of the case and coupled to a lower portion of the magnet.

The stator part may further include a plate yoke coupled to an upper surface of an inner side of the bracket and coupled to an upper portion of the magnet.

The stator part may further include a plate yoke selectively positioned on the first and second magnets.

The vibrator part may further include: a coil electrically connected to the other end of the printed circuit board; a weight body coupled to an outer peripheral surface of the coil; and a cylindrical yoke coupled between the weight body and the coil to thereby increase magnetic force of the magnet, and the other end of the elastic member and an upper portion of the yoke may be fixedly coupled to each other.

The elastic member may include: an upper plate part fixedly coupled to an upper surface of an inner side of the stator part; a lower plate part fixedly coupled to an upper portion of the vibrator part; and a plurality of bending parts connecting the upper and lower plate parts to each other and generating elastic force, and elastically support linear movement of the vibrator part.

The linear vibration motor may further include a damper coupled to a lower portion of the power supplying part of the printed circuit board so as to face the stator part to thereby prevent noise and impact from being generated at the time of contact between the printed circuit board and the stator part.

DESCRIPTION OF THE PREFERRED EMBODIMENTS

Figure 1:
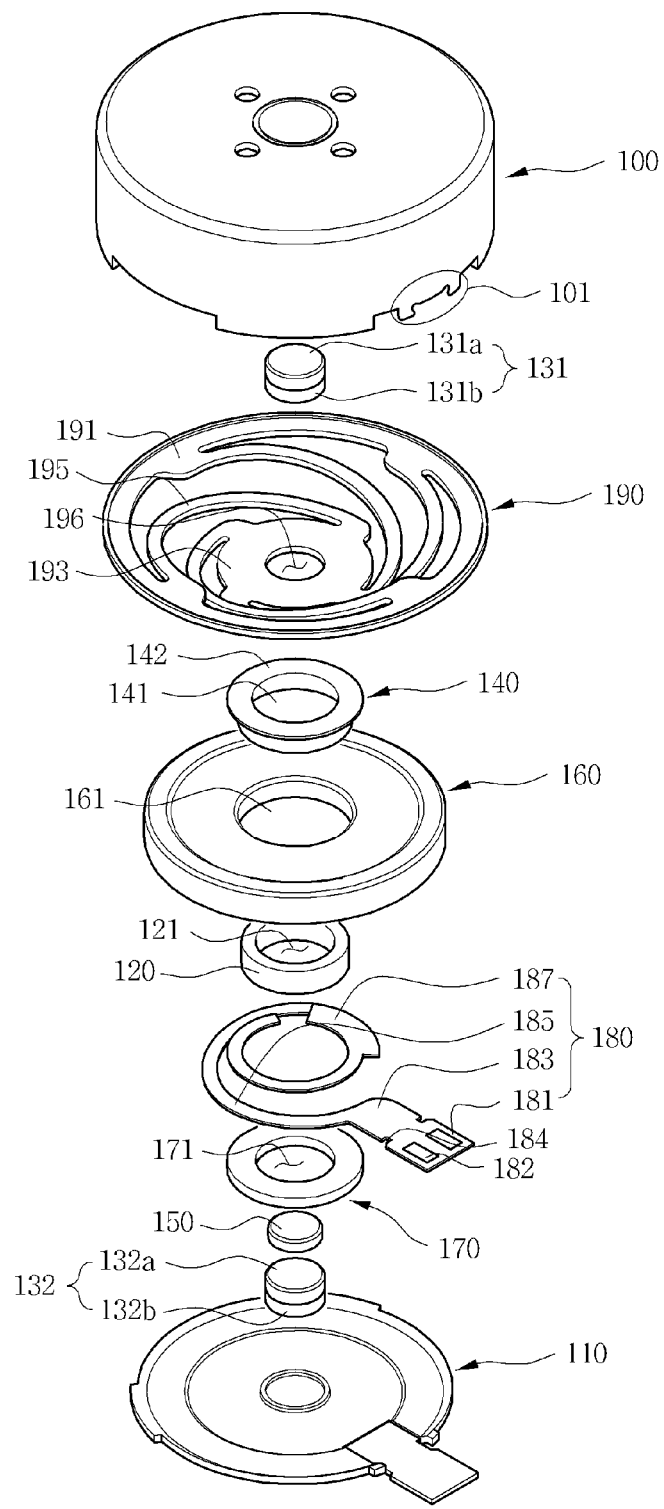
FIG. 1 is an exploded perspective view of a linear vibration motor according to a preferred embodiment of the present invention.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
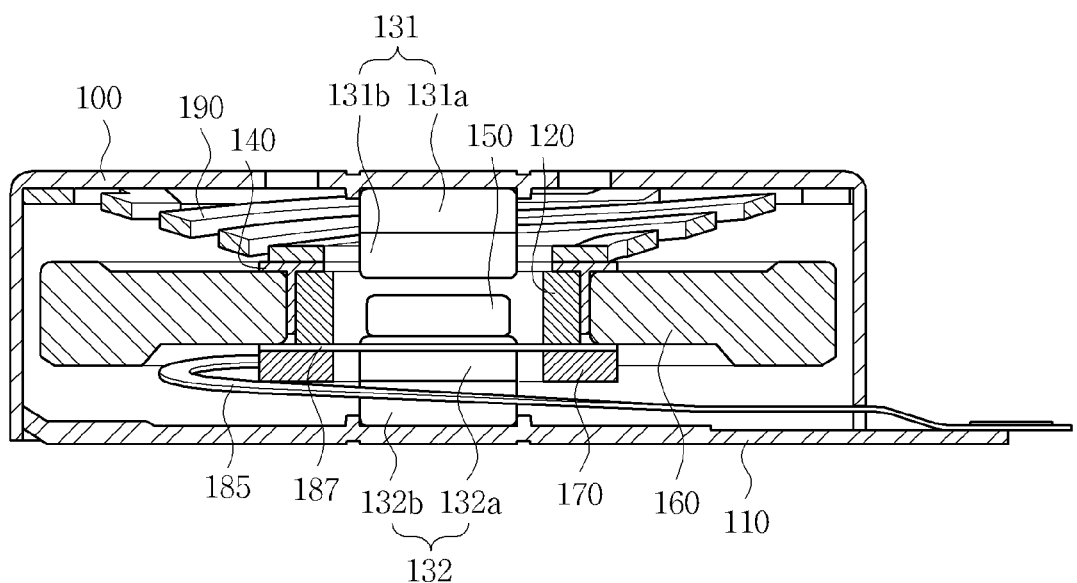
FIG. 2 is a cross-sectional view showing a coupled state of the linear vibration motor shown in FIG. 1.

FIG. 1 is an exploded perspective view showing a linear vibration motor according to a preferred embodiment of the present invention; and FIG. 2 is a cross-sectional view showing a coupled state of the linear vibration motor shown in FIG. 1. As shown, the linear vibration motor according to the preferred embodiment of the present invention is configured to include a stator part, a vibrator part, and an elastic member elastically supporting linear vibration of the vibrator part.

More specifically, the stator part includes a case 100, a bracket 110, a magnet 130, and a plate yoke 150, and the vibrator part includes a coil 120, a weight body 160, a yoke 140, and a printed circuit board 180.

The case 100 has an inner space formed therein so as to receive the linearly moving vibrator part therein, and the bracket 110 is coupled to a lower portion of the case 100 to thereby compart the inner space of the case 100.

In addition, the case 100 includes a coupling part 101 formed at a lower portion thereof, wherein the coupling part 101 is coupled to a portion of the printed circuit board 180 to be described below.

Figure 3:
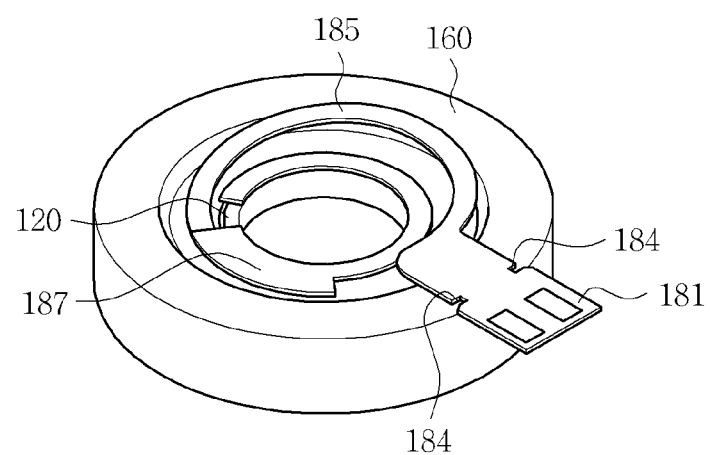
FIG. 3 is a schematic view showing a coupled relationship between a weight body and a printed circuit board that configure a vibrator part according to the preferred embodiment of the present invention.

Further, the magnet 130 may be selectively coupled to any one of the case 100 and the bracket 110. According to the preferred embodiment of the present invention, the magnet 130 is formed in plural as shown in FIGS. 1 and 3.

However, the number of magnets according to the preferred embodiment of the present invention is not limited thereto. That is, a single magnet 130 may be coupled to only an upper surface of an inner side of the case 100 or only an upper surface of an inner side of the bracket 110.

More specifically, the magnet 130 according to the preferred embodiment of the present invention includes a first magnet 131 coupled to the upper surface of the inner side of the case 100 and a second magnet 132 coupled to the upper surface of the inner side of the bracket 110.

In addition, the first and second magnets 131 and 132 may be disposed so that portions thereof having same polarity face to each other in order to increase magnetic force.

For example, when a lower portion 131b of the first magnet 131 is an S pole and an upper portion 131a thereof is an N pole, a lower portion 132b of the second magnet 132 becomes an N pole and an upper portion 132a thereof becomes an S pole.

Further, a sequence of polarities is not limited to the contents described in the present invention but may be reverse.

Therefore, the first and second magnets 131 and 132 are spaced apart from each other by a predetermined interval a to thereby form a magnetic field in a vertical direction.

In addition, the plate yoke 150 may be selectively coupled to the first and second magnets 131 and 132 in order to collect the magnetic field. In the case of the linear vibration motor according to the preferred embodiment of the present invention, the plate yoke 150 is coupled to the upper portion 132a of the second magnet 132 as shown.

As shown in FIGS. 2 and 3, the coil 120 may be formed to have a cylindrical shape in which it is provided with a hollow part 121 capable of receiving the first and second magnets 131 and 132 therein in order to generate electromagnetic force through electromagnetic induction along outer peripheral surfaces of the first and second magnets 131 and 132.

In addition, the coil 120 is electrically connected to the other end of the printed circuit board 180 to thereby form a magnetic field by power applied from the printed circuit board 180.

The yoke 140 is provided with a reception groove 141 coupled to an outer peripheral surface of the coil 120 and has an upper surface 142 coupled to an upper portion of the weight body 160 to be described below.

The weight body 160 is provided with a hollow part 161 for receiving the coil 120 therein, and the yoke 140 coupled to the outer peripheral surface of the coil 120 is coupled to an inner peripheral surface of the hollow hole 161 of the weight body 160 and the upper portion of the weight body 160.

In addition, the weight body 160 is fixedly coupled to the other end of the printed circuit board 180 to thereby linearly vibrate integrally with the printed circuit board 180.

The printed circuit board 180 includes a power supplying part 181, a mounting part 183, and an elastic part 185, and a power applying part 187.

More specifically, the power supplying part 181 is fixedly coupled to an upper portion of the bracket 110 and is provided with a power connection pad 182 for receiving external power from a set component.

In addition, the mounting part 183 is extended from the power supplying part 181 and is coupled to the coupling part 101 of the case 100 configuring the stator part.

More specifically, the mounting part 183 includes predetermined grooves 184 formed inwardly in a width direction at both sides thereof in order to be coupled to the coupling part 101 of the case 100 to be described below.

In addition, the elastic part 185 is extended from the mounting part 183 in a spiral direction so as to have elastic force.

Further, the power applying part 187 is formed at one end of the elastic part 185 extended in the spiral direction and has an upper surface coupled to the coil 120 of the vibrator part to thereby apply the external power to the coil 120.

In addition, as shown in FIG. 3, which is a schematic view showing a coupled relationship between a weight body and a printed circuit board that configure a vibrator part according to the preferred embodiment of the present invention, the power applying part 187 is partially fixed to a lower portion of the weight body 160 to thereby linearly move integrally with the weight body 160.

Therefore, the printed circuit board 180 is a flexible printed circuit (FPC) board having elastic force so that it has one end fixedly coupled to the bracket 110 configuring the stator part and the other end coupled to the coil 120 and the weight body 160 configuring the vibrator part to thereby linearly move integrally with the vibrator part, and may have a spring shape or a coil spring shape extended in the spiral direction.

The elastic member 190, which has a leaf spring shape, includes an upper plate part 191, a lower plate part 193, and a plurality of bending parts 195 and is coupled to the yoke 140 and the case 100.

More specifically, the upper plate part 191 is fixedly coupled to the upper surface of the inner side of the case 100.

In addition, the lower plate part 193 is fixedly coupled to an upper portion of the yoke 140 configuring the stator part.

Further, the plurality of bending parts 195 serve to drive the elastic member 190. More specifically, in order to generate elastic force, each of the plurality of bending parts 195 has one end connected to the upper plate part 191 and the other end connected to the lower plate part 193, such that it is extended from the upper plate part 191 to the lower plate part 193 in the spiral direction.

In addition, the upper plate part 191 and the lower plate part 193 of the elastic member 190 are provided with a hollow part 196 in which the first and second magnets 131 and 132 are disposed in order to prevent contact with outer peripheral surfaces of the first magnet 131 coupled to the upper surface of the inner side of the case 100 and the second magnet 132 coupled to the upper surface of the inner side of the bracket 110 while they elastically support the vibrator part.

Therefore, the elastic member 190 may be formed to have a spring shape or a coil spring shape extending in the spiral direction.

The damper 170 is selectively coupled to the upper surface of the inner side of the printed circuit board 180 or the bracket 110 in order to prevent noise and impact from being generated at the time of contact between the printed circuit board 180 and the bracket 110 due to excessive linear vibration of the vibrator part.

More specifically, according to the preferred embodiment of the present invention, the damper 170 is coupled to a lower portion of the power supplying part 181 of the printed circuit board 180 so as to face the bracket 110.

In addition, the damper 170 is provided with a hollow part 171 so that the first magnet 131 fixedly coupled to the upper surface of the inner side of the case and the second magnet 132 fixedly coupled to the upper surface of the inner side of the bracket 110 are disposed therein.

Figure 4:
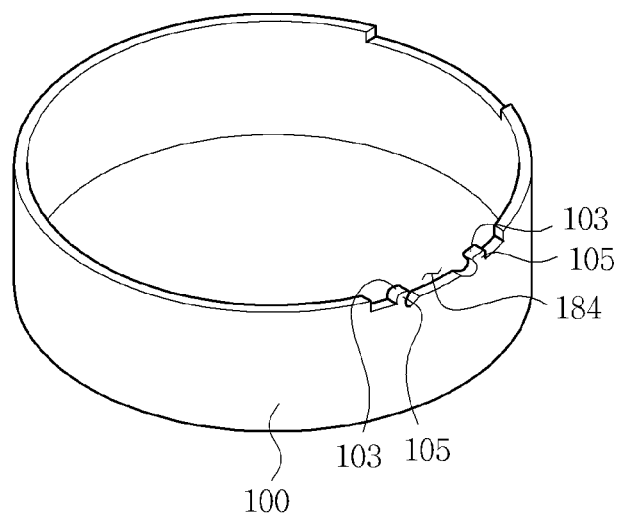
FIG. 4 is a schematic perspective view of a case configuring a stator part according to the preferred embodiment of the present invention.

FIG. 4 is a schematic perspective view of a case configuring a stator part according to the preferred embodiment of the present invention. As shown, the coupling part 101 of the case 100 is provided with a penetration groove 102 so that a portion of the printed circuit board 180 is connected to an external set component.

In addition, in order to support the printed circuit board 180 coupled to the penetration groove 102 of the coupling part 101, both sides of the penetration grooves 102 are provided with support parts 105 each including a catching jaw 103 and protruded toward the bracket 110.

Figure 5:
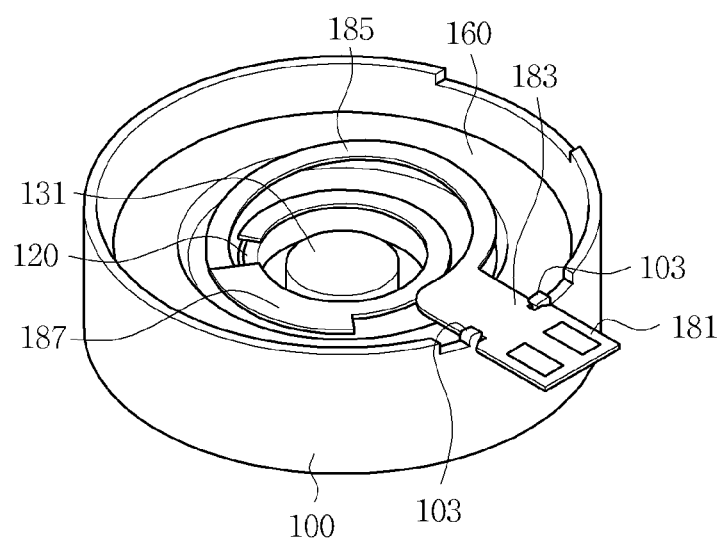
FIG. 5 is a schematic view showing a coupled relationship between the printed circuit board and a case according to the preferred embodiment of the present invention.
Figure 6:
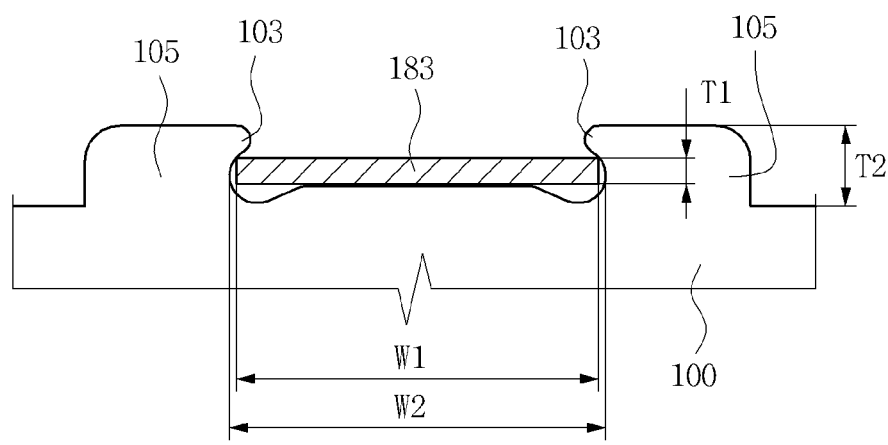
FIG. 6 is a schematic cross-sectional view showing a coupled state between the printed circuit board and the case shown in FIG. 5.

FIG. 5 is a schematic view showing a coupled relationship between the printed circuit board and a case according to the preferred embodiment of the present invention; and FIG. 6 is a schematic cross-sectional view showing a coupled state between the printed circuit board and the case shown in FIG. 5. As shown, the printed circuit board 180 has a thickness T1 smaller than a height T2 of the support part configuring the mounting part 101 of the case 100.

In addition, the printed circuit board 180 has a width W1 equal to or slightly smaller than a width W2 of the penetration groove 181 of the case 180.

Therefore, when the mounting part 183 of the printed circuit board 180 is press-fitted so that the catching jaws 103 of the case 100 and the grooves 184 formed at both sides of the mounting part 183 of the printed circuit board 180 are positioned to face each other, the mounting part 183 of the printed circuit board 180 made of an elastic material is naturally press-fitted and fitting-coupled into the coupling part 101 of the case 100.

Therefore, since the support parts 105 of the case 100 support the mounting part 183 of the printed circuit board 180 in a width direction and the catching jaws 103 support a rear side of the mounting part 183, even though the printed circuit board 180 linearly vibrates integrally with the vibrator part, it is possible to prevent the printed circuit board 180 from being detached from the case 100.

In addition, even though the printed circuit board 180 coupled integrally with the vibrator part is partially damaged due to linear vibration for a long period of time or electrical connection between the printed circuit board 180 and the coil 120 is short-circuited, the damaged printed circuit board is easily detached from the coupling part 121 of the case 100, such that it may be replaced with a new printed circuit board.

According to the preferred embodiment of the present invention, it is possible to increase fixing force between the printed circuit board that linearly moves integrally with the vibrator part and the stator part.

In addition, a movable displacement of the printed circuit board that linearly moves is maintained to be constant, thereby making it possible to minimize a change in vibration force and frequency of the vibrator part.

Further, an insulation defect between the printed circuit board and the stator part is prevented, thereby making it possible to increase a yield of a product.

Furthermore, even though the printed circuit board coupled integrally with the vibrator part is partially damaged due to linear vibration for a long period of time or electrical connection between the printed circuit board and the coil is short-circuited, the damaged printed circuit board is easily detached from the stator part, such that it may be replaced with a new printed circuit board.

Although the preferred embodiments of the present invention have been disclosed for illustrative purposes, they are for specifically explaining the present invention and thus a linear vibration motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:
1. A linear vibration motor comprising:
a stator part comprising a magnet and a case having an inner space and a coupling part;
a vibrator part comprising a coil disposed to face the magnet and a printed circuit board electrically connected to the coil, and received in the case to thereby linearly vibrate; and
an elastic member comprising one end fixedly coupled to the stator part and the other end fixedly coupled to the vibrator part,
wherein the printed circuit board comprises:
a power supplying part fixedly coupled to the stator part and comprising a power connection pad;
a mounting part extended from the power supplying part and coupled to the coupling part of the case;

an elastic part extended from the mounting part in a spiral direction so as to have elastic force; and a power applying part formed at one end of the elastic part and electrically coupled to the coil, wherein the printed circuit board is partially coupled to the coupling part of the case, wherein the coupling part comprises:

a penetration groove formed so that the mounting part of the printed circuit hoard is fitting-coupled thereinto in a width direction; and a plurality of support parts formed to protrude from both sides of the penetration groove toward the bracket and each comprising catching jaws formed to support the mounting part of the printed circuit board, wherein the mounting part comprises predetermined grooves formed inwardly in the width direction at both sides thereof so as to face the catching jaws.

2. The linear vibration motor as set forth in claim 1, wherein the stator part further includes:

a bracket coupled to a lower portion of the case to thereby compart the inner space of the case.

3. The linear vibration motor as set forth in claim 2, wherein the magnet includes:

a first magnet coupled to a surface of the case; and a second magnet coupled to a surface of the bracket.

4. The linear vibration motor as set forth in claim 3, wherein the stator part further includes a plate yoke coupled to the first magnet.

5. The linear vibration motor as set forth in claim 3, wherein the stator part further includes a plate yoke coupled to the second magnet.

6. The linear vibration motor as set forth in claim 1, wherein the vibrator part further includes:

a weight body coupled to an outer peripheral surface of the coil; and a cylindrical yoke coupled between the weight body and the coil to thereby increase magnetic force of the magnet, and wherein the other end of the elastic member and an upper portion of the yoke are fixedly coupled to each other.

7. The linear vibration motor as set forth in claim 1, wherein the elastic member includes:

an upper, plate part fixedly coupled to an upper surface of an inner side of the stator part;

a lower plate part fixedly coupled to an upper portion of the vibrator part; and a plurality of bending parts connecting the upper and lower plate parts to each other and generating elastic force, and elastically supports linear movement of the vibrator part.

8. The linear vibration motor as set forth in claim 1, further comprising a damper coupled to a lower portion of the power supplying part of the printed circuit board so as to face the stator part to thereby prevent noise and impact from being generated at the time of contact between the printed circuit board and the stator part.

* * * * *